March 9, 1954
W. H. BUSSEY
2,671,335
THERMOMETRIC SYSTEM FOR MEASURING THE FREEZING POINT
Filed Jan. 31, 1951
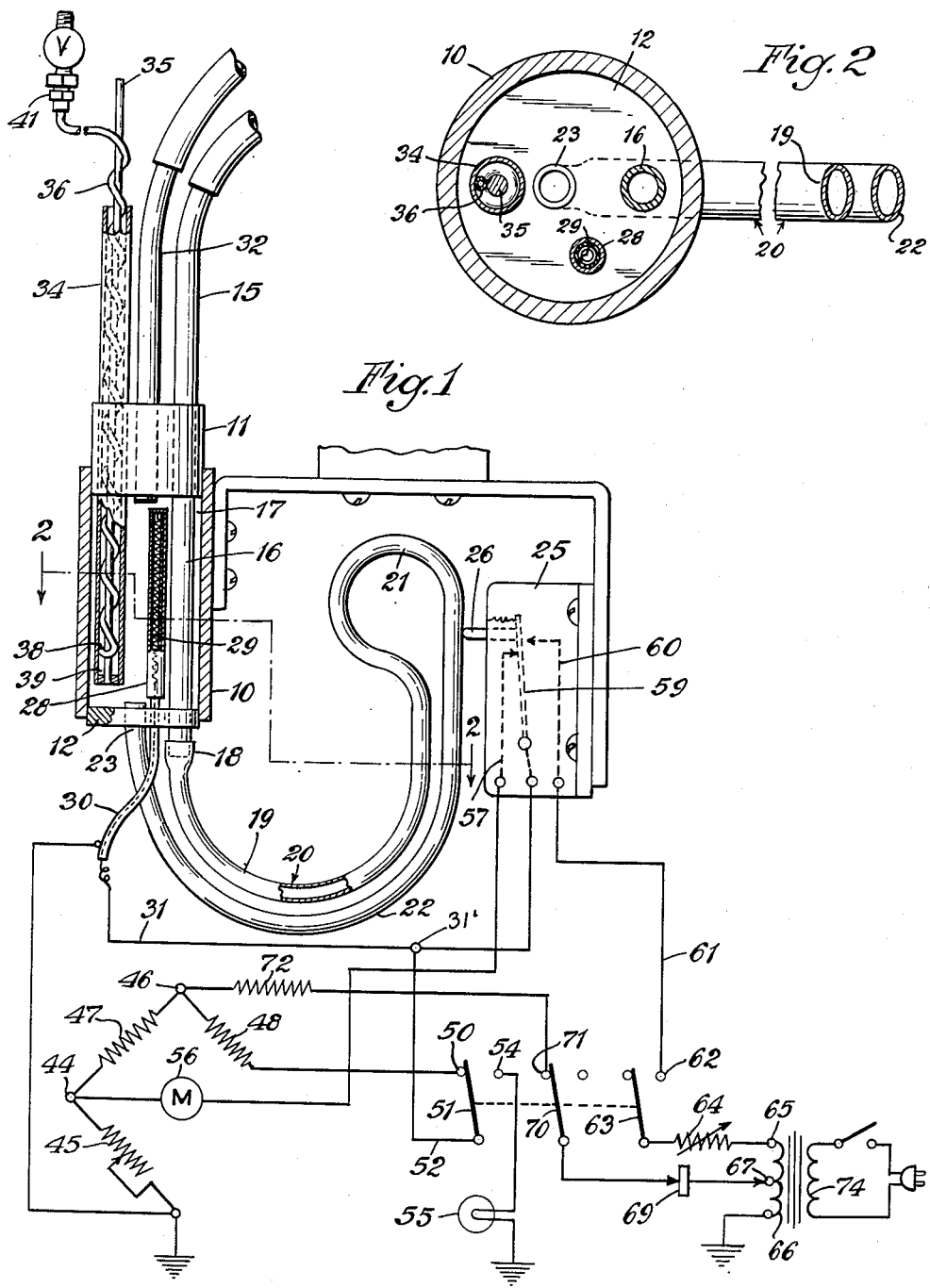
Inventor
William H. Bussey
by Robert L. Kahn
Attorney

Patented Mar. 9, 1954

2,671,335

UNITED STATES PATENT OFFICE 2,671,335

THERMOMETRIC SYSTEM FOR MEASURING THE FREEZING POINT

William H. Bussey, Rockford, Ill.

Application January 31, 1951, Serial No. 208,828

7 Claims. (Cl. 73—17)

This invention relates to a thermometric system for measuring the freezing point of a liquid and in particular for measuring the freezing points of anti-freeze liquids used in automobile radiators and the like. As is well known, a number of fundamentally different chemicals are used as anti-freeze liquids in automobile radiators. Thus, one class of such liquids generally comprises ethylene glycol, with or without various compounds for preventing foaming and rust. A still different class of compounds utilize alcohols ranging from methyl up to the higher alcohols with or without anti-foaming and anti-rust agents. These various anti-freze liquids are all sold under various trade names and mixing such liquids results in confusion and uncertainty as to their precise effectiveness in cold weather.

As a rule, freezing point tables for such liquids based upon specific gravity have been provided. However, these tables are reliable only if the anti-freeze liquids and radiator mixture remain pure. Frequently an automobile owner will start a winter season with one type of anti-freeze and may add different anti-freezes as the season progresses. In such case, the specific gravity readings become meaningless and the extent of protection against freezing becomes uncertain. Even if the anti-freeze remains pure, nevertheless, the addition of anti-foaming and anti-rust preventatives by the user, apart from the anti-freeze liquid itself, may have the effect of impairing seriously the reliability of specific gravity readings.

In order to obviate the above disadvantages, this invention provides a novel system for determining accurately the freezing point of the liquid by subjecting a small sample of the liquid to freezing conditions. The system embodying the invention is simple and effective and operates with sufficient rapidity so that it may be used with substantially the same ease as present-day specific gravity meters.

A structure embodying the present invention is characterized by mechanical simplicity, great accuracy of measurement and ready determination of the freezing point together with a limited requirement of the sample to be tested. In accordance with this invention, a device is provided wherein expansion of compressed gas such as carbon dioxide is relied upon for effecting the freezing of a sample. The physical construction of a device embodying the present invention is such that when the sample begins to freeze, the expansion of the frozen sample is utilized to show the operator that the sample is frozen and to read the indicator where temperature is shown. By virtue of the system embodying the present invention, the purity of the sample is assured together with a complete absence of air bubbles which may have a tendency to mask the expansion of the material during freezing. Means are also provided for quickly thawing the frozen sample after which the sample may be discarded and the system ready for a new cycle of measurement.

In order that the invention may be fully understood, it will now be explained in connection with the drawings wherein:

Figure 1 is a view partly in section of an apparatus embodying the present invention together with a diagrammatic showing of the circuit in which such apparatus is connected.

Figure 2 is a view on line 2—2 of the apparatus shown in Figure 1.

Referring now to the drawings, sleeve 10 is provided, this sleeve being made preferably of copper or aluminum although any other rigid metal or plastic may be used if desired. Sleeve 10 has plugs 11 and 12 at the top and bottom ends respectively. Plugs 11 and 12 are also preferably of copper or brass or aluminum but may be of any other material. Preferably, however, the sleeve and plugs are both of material having low specific heat and good heat conductivity.

Projecting through plugs 11 and 12 is tube 15 having portion 16 disposed within chamber 17 formed by the sleeve and the plugs. Tube 15 extends through plug 12 and is coupled to end 18 of a two-section Bourdon tube generally indicated by numeral 20. Bourdon tube 20 has section 19, this section carrying end 18. Pipe section 19 terminates in loop portion 21, the pipe continuing to Bourdon section 22 lying adjacent Bourdon section 19 and having end portion 23 passing through bottom plug 12 and terminating in the bottom of chamber 17. Bourdon tube portions 19 and 22 are elliptical in cross section, due to bending and have a tendency to straighten out when the pressure within the pipe goes above atmospheric pressure. It is understood that the Bourdon tube is of brass, bronze or copper or any other resilient metal suitable for the purpose.

Cooperating with loop portion 21 of the Bourdon tube part is electric switch 25 carrying feeler finger 26 abutting against the movable end of the Bourdon tube. It is understood that switch 25 is rigidly secured so as to be fixed with relation to sleeve 10 and the Bourdon tube is free to move the looped end to the right with increase in pressure within the tube. Finger 26 is part of a suitable switch mechanism so that slight movement of finger 26 to the right will serve to operate a switch. Such switches are available in the trade, one particular type of switch being sold under the name "microswitch." As a rule such switches may be operated by a movement of finger 26 of the order of a few hundredths of an inch. Other switches and switch mechanism may be used. Inasmuch as such switches are well known, no attempt is made to describe the construction.

Disposed within chamber 17 of the sleeve is tube 28 of a metal such as copper or the like. Insulatingly sealed within tube 28 is resistance element 29 of any suitable material, such as nickel, German silver or the like having a substantial temperature coefficient. Tube 28 and the sealed resistance element 29 are carried within the chamber and capillary tube 30, carrying insulated wire 31 within it, passes through plug 12. Tube 28 forms one pole and wire 31 forms the other pole of temperature-responsive resistor 29. It is preferred to have tube 28 of copper or other good heat-conducting material and the resistance element within the tube is so disposed that the entire tube and resistance element can quickly adapt itself to the temperature prevailing within chamber 17.

Plug 11 carries tube 32 of copper or the like, this tube extending through plug 11 and terminating at the top of chamber 17. Plug 11 also carries sleeve 34 of copper or other suitable metal carrying rod 35 and capillary tube 36 coiled around the rod within sleeve 34. Capillary tube 36 is of fine copper tubing or brass tubing as desired and terminates at 38 near end 39 of sleeve 34 at the bottom of chamber 17. Rod 35 extends into sleeve 34 to the bottom thereof and the rod and sleeve are soldered or otherwise attached at the end, the sleeve being sealed as far as chamber 17 is concerned.

Capillary tube 36 terminates in a suitable fitting 41 to which may be attached a tank of compressed gas such as carbon dioxide, it being understood that a suitable valve control is provided. The arrangement of capillary and rod within sleeve 34 is such that compressed gas going down to the capillary is discharged from the end of the capillary near the bottom of the sleeve and escapes into the helical region formed around rod 35 between the turns of the capillary. The gas is finally allowed to escape at the free end of sleeve 34, it being understood that the length of capillary, the pitch of capillary turn and the relative dimensions of sleeve and rod are so designed as to produce a desired cooling effect around the outside of the sleeve within chamber 17.

Referring now to the electrical connections, temperature-responsive coil 29 forms one arm of a bridge. Thus tube 30 is grounded to the instrument while wire 31 has one point 31' of the bridge. Between ground 30 and bridge point 44 is variable resistor 45. Between bridge point 44 and bridge point 46 is resistor 47. Bridge point 46 is connected to one terminal of resistor 48, the other terminal of this resistor going to fixed contact 50 of one section of a ganged switch. Fixed contact 50 cooperates with movable contact 51, this being connected by wire 52 to bridge point 31'. Movable contact 51 is also adapted to cooperate with fixed contact 54 connected to lamp 55 having one terminal grounded.

Bridge point 44 is connected to one terminal of meter or indicating instrument 56, the other terminal of this instrument being connected to fixed contact 57 of Bourdon tube switch 25. Fixed contact 57 cooperates with movable contact 59, this being connected to bridge point 31'. Movable switch contact 59 also cooperates with fixed contact 60, which contact is connected by wire 61 to fixed switch contact 62 of the second section of the ganged switch. Fixed switch contact 62 cooperates with movable contact 63 connected through variable resistor 64 to terminal 65 of transformer winding 66. Transformer winding 66 has its bottom terminal grounded and has intermediate terminal 67 connected through rectifier 69 to movable contact 70 of a third section of the ganged switch. Movable contact 70 cooperates with fixed contact 71 connected through resistor 72 to bridge point 46.

Transformer winding 66 is a secondary of a transformer whose primary 74 is adapted to be supplied by conventional 110 volt 60 cycle current.

As is readily apparent, the movable contacts of the three ganged switch sections move as a unit. The left hand position of the movable contacts is used when the device is indicating a freezing temperature while the right hand position of the switches is used when it is desired to thaw the frozen mixture and discard the liquid.

The operation of the system is as follows: Assume that the switch contacts are in the position shown. A sample of liquid to be tested is forced into tube 15 by a syringe or any other suitable means. The sample should be sufficiently large so that any previous liquid remaining within the Bourdon tube parts and within chamber 17 is flushed out. By having the volume of chamber 17 rather small and having the Bourdon tube short, it is possible to satisfy this requirement without using more than a small quantity of liquid. It is understood that the apparatus will be in the position as shown and when liquid is discharged from drain pipe 32 in sufficient quantity, the apparatus is ready to function, the Bourdon tube and chamber being filled with clean liquid free of air bubbles. Any air bubbles in the system will be flushed out and tend to rise in drain pipe 32. Assuming that capillary 36 is connected to a tank of compressed gas, such as carbon dioxide, the valve for controlling the gas may be opened momentarily and a shot of compressed gas given to the capillary. As is well known, the expansion of the compressed gas around the capillary within sleeve 34 and inside of chamber 17 will result in the temperature within the chamber being reduced. The liquid within chamber 17 will begin to freeze, this freezing generally beginning at the top of the chamber and progressing downwardly within the chamber toward plug 12. As the liquid within chamber 17 freezes, it expands and exerts pressure upon the liquid within Bourdon tube part 22. This pressure is communicated to the liquid in the Bourdon tube, the liquid within portion 16 of the pipe being frozen and acting to maintain the liquid within the Bourdon tube under pressure.

With the manually controlled switches in the position shown, rectified current from intermediate terminal 67 and ground of the transformer winding will cause a predetermined difference of potential to exist across bridge points 44 and 31. The resistance of temperature-responsive element 29 will unbalance the bridge as the liquid cools and causes meter 56 to indicate the temperature, assuming that the meter is properly calibrated. The bridge arrangement is well known and makes it possible to indicate accurately the potential difference across bridge points 31 and 44 and thus the corresponding temperature in spite of variations in potential applied to the bridge. Variable resistor 45 is provided for calibrating the bridge.

When the liquid in chamber 17 is freezing, switch 25 is operated to move contact 59 away from 57 to 60.

It is understood that in reading meter 56, the maximum swing of the needle during freezing should be observed, this indicating the freezing point of the liquid. It is possible to obtain temperatures below the freezing point of the needle, this, in general, being due to excessive quantities of compressed gas being used. However, since a substantial quantity of heat is absorbed by the liquid during the freezing process without change of temperature, the operation of switch 25 during freezing makes it possible for an accurate reading of the freezing point to be obtained before the meter is disconnected.

After the temperature of the frozen liquid has been obtained, the manual switch is thrown to the right. When this occurs, rectified current is no longer applied to the bridge terminals. Instead, the potential of the entire transformer secondary is applied. The circuit may be traced as follows: terminal 65 through resistor 64, switch contacts 63 and 62, wire 61, switch contacts 60 and 59 to bridge point 31'. From there one circuit continues along wire 52 through contacts 51 and 54 to lamp 55 to ground. Thus lamp 55 will go on to show that thawing is occurring. The other circuit continues from bridge point 31' through temperature-responsive resistance 29 to ground. Thus current will flow through the temperature-responsive element and heat the same. By proper design, sufficient heat can be generated within the temperature element to melt the frozen material within chamber 17 and release switch 25 to open the heating circuit. Any remanent liquid will be flushed out with the next sample.

In practice, it is possible to freeze a small sample of liquid in a few seconds. The thawing may be accomplished within a few seconds. Thereafter, the manual switch may be set for a new cycle of temperature reading.

Various changes may be made in the device. Thus, for example, it may be possible to provide a flexible diaphragm for the bottom of chamber 17 instead of plug 12. The flexible diaphragm itself may be utilized to operate a switch or operate a Bourdon tube to indicate freezing. It is also possible to have drain pipe 32 extend from the bottom of the chamber in which case a valve may have to be supplied.

What is claimed is:

1. In a device of the character described, a chamber, a Bourdon tube system having two ends, one end of said Bourdon tube system terminating within said chamber and the other end of said Bourdon tube system passing through said chamber and terminating in a filling portion, gas expansion means within said chamber but sealed therefrom, said last named means including a gas inlet and a gas outlet so that when compressed gas is introduced into said inlet a freezing temperature within said chamber will be created, a temperature-responsive resistor within said chamber, means connected to said resistor for indicating the temperature corresponding to the resistance of said resistor, switch means in said indicating means circuit, and means connecting said Bourdon tube system and said last named switch means for changing the indicating circuit condition when the liquid in said chamber is freezing, said liquid being adapted to freeze within the chamber and within part of the Bourdon tube system passing through said chamber, the inlet for said Bourdon tube system being adapted to receive liquid to be tested, said chamber having an outlet for excess liquid so that the device may be flushed when a new sample is introduced.

2. The system of claim 1 wherein a source of heating current is provided, manual switch means for connecting said source to said resistor and wherein said heating current source includes the Bourdon-operated switch, said heating circuit being adapted to be closed only when liquid in said chamber is frozen.

3. The system according to claim 1 wherein said chamber has an outlet near the top thereof in the normal position of the device, so that a liquid sample may force out dirt and air bubbles ahead of it out through the top of the chamber.

4. The system according to claim 1 wherein said gas expansion means includes a sleeve, a rod within said sleeve and a coiled capillary tube within said sleeve and around said rod, said capillary tube terminating within said sleeve to discharge gas into a helical space formed between the coils of the capillary within the sleeve and outside of the rod.

5. In a device for determining the freezing point of a liquid, a chamber, a pressure responsive system having inlet and outlet connections, one connection opening into said chamber and the other connection passing through said chamber and terminating in a filling portion, said system including a part having a flexible wall portion movable in response to pressure, means for chilling said chamber and the contents therein so that liquid to be tested will freeze, a temperature responsive resistor disposed in said chamber, circuit means, including said resistor, for indicating the temperature corresponding to the resistance of said resistor, switching means in said circuit, and means operated by the movement of said pressure responsive flexible wall for operating said switching means, said switching means when operated by said pressure responsive wall upon the occurrence of freezing within said chamber disabling said temperature indicating circuit, the inlet and outlet connections for said pressure responsive system being shut off when the liquid in said chamber has frozen and exerting pressure upon the liquid within the pressure responsive system for operating said switch, said pressure responsive system being disposed below the normal liquid level in the chamber during normal operation thereof whereby the introduction of a liquid sample within said device will serve to flush previous liquid contents therefrom.

6. The construction according to claim 5 wherein said two connections of the pressure responsive system extend from the bottom of said chamber and wherein an outlet for the chamber is provided at the top so that any gas bubbles will be eliminated from the system.

7. The system according to claim 5 wherein means are provided for supplying a heating current to said resistor to thaw the liquid contents in said chamber after a temperature reading has been obtained.

WILLIAM H. BUSSEY.

References Cited in the file of this patent
UNITED STATES PATENTS

| Number | Name | Date |
|---|---|---|
| 2,297,641 | Webber | Sept. 29, 1942 |